US010877274B1

(12) United States Patent
Trail (10) Patent No.: US 10,877,274 B1
(45) Date of Patent: Dec. 29, 2020

(54) COMPOSITE OPTICAL ELEMENT FOR EYE TRACKING HAVING BEAM SPLITTER FORMED BY COUPLING OF JUNCTION SURFACES

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 345 days.

(21) Appl. No.: 15/881,276

(22) Filed: Jan. 26, 2018

Related U.S. Application Data

(60) Provisional application No. 62/451,486, filed on Jan. 27, 2017.

(51) Int. Cl.
*G02B 27/01* (2006.01)
*G02B 27/10* (2006.01)
*G02B 27/14* (2006.01)
*G02B 27/00* (2006.01)
*G06F 3/01* (2006.01)
*G06T 7/80* (2017.01)
*G02B 27/28* (2006.01)

(52) U.S. Cl.
CPC ..... *G02B 27/0172* (2013.01); *G02B 27/0093* (2013.01); *G02B 27/14* (2013.01); *G06F 3/013* (2013.01); *G06T 7/80* (2017.01); *G02B 27/017* (2013.01); *G02B 27/0176* (2013.01); *G02B 27/1006* (2013.01); *G02B 27/142* (2013.01); *G02B 27/283* (2013.01); *G02B 2027/014* (2013.01); *G02B 2027/0123* (2013.01); *G02B 2027/0138* (2013.01)

(58) Field of Classification Search
CPC .......... G02B 2003/0093; G02B 13/006; G02B 13/14; G02B 13/146; G02B 13/18; G02B 5/26; G02B 27/0093; G02B 2027/011; G02B 2027/015; G02B 2027/0152; G02B 27/017; G02B 27/0172; G02B 27/0176; G02B 27/0178; G02B 27/1006; G02B 27/14; G02B 27/141; G02B 27/142
USPC ....... 359/367, 581, 583, 589, 630, 634, 637, 359/722, 723, 726, 732, 738, 796
See application file for complete search history.

(56) References Cited

U.S. PATENT DOCUMENTS

| | | | | |
|---|---|---|---|---|
| 5,886,822 A * | 3/1999 | Spitzer | ............... | G02B 27/0172 359/630 |
| 2012/0326948 A1* | 12/2012 | Crocco | .............. | G02B 27/0172 345/7 |
| 2015/0138451 A1* | 5/2015 | Amitai | ............... | G02B 27/0172 349/11 |

* cited by examiner

*Primary Examiner* — Ryan S Dunning
(74) *Attorney, Agent, or Firm* — Fenwick & West LLP (57) ABSTRACT

A composite optical element includes a first optical component and a second optical component. The first optical component includes a first front surface, a first back surface, and a first junction surface. The second optical component that includes an end surface, a second front surface, a second back surface, and a second junction surface. The first front surface and the second front surface together form a first surface of the composite optical element, and the first back surface and the second back surface together form a second surface of the composite optical element. The second junction surface is coupled to the first junction surface to form a beam splitter that transmits light in a first band and reflects light in a second band toward the end surface.

20 Claims, 7 Drawing Sheets

COMPOSITE OPTICAL ELEMENT FOR EYE TRACKING HAVING BEAM SPLITTER FORMED BY COUPLING OF JUNCTION SURFACES

CROSS REFERENCE TO RELATED APPLICATION

This application claims the benefit of priority to U.S. Provisional Application No. 62/451,486, filed on Jan. 27, 2017, which is incorporated herein in its entirety for all purposes.

BACKGROUND

The present disclosure generally relates to eye tracking, and specifically relates to using a composite optical element for eye tracking in virtual reality and/or augmented reality applications.

Virtual reality (VR) systems typically include a display panel that presents VR images. These VR images may depict virtual elements belonging to a VR environment or may combine real elements (e.g., tall grass in the physical world) with virtual elements (e.g., an anime animal hiding in the tall grass), as in augmented reality applications. To gain a fully immersive experience in the VR environment, a user may interact with a portion of the VR image via an eye tracking system within a head-mounted display. An eye tracking system may correlate the user's gaze and attention with the portion of the VR image. For example, a VR system may increase resolution of the portion of VR image that the user is gazing at, and may reduce resolution of the periphery of that image gradually or in a step-wise fashion. However, the challenge is to design and develop eye tracking systems that are compact and maintain stability in a near-to-eye display system.

SUMMARY

A composite optical element for eye tracking applications. The composite optical element includes a first optical component and a second optical component that are coupled together. The first optical component includes a first front surface, a first back surface, and a first junction surface. The second optical component that includes an end surface, a second front surface, a second back surface, and a second junction surface. The first front surface and the second front surface together form a first surface of the composite optical element, and the first back surface and the second back surface together form a second surface of the composite optical element. The second junction surface is coupled to the first junction surface to form a beam splitter that transmits light in a first band (e.g., visible light) and reflects light in a second band (e.g., infrared light) toward the end surface.

The composite optical element may be part of a head-mounted display (HMD). The HMD may include, e.g., an electronic display that emits light in the first band and an eye tracking unit that captures light in the second band. The eye tracking unit may be configured to detect light in the second band that passes through the end surface of the composite optical element.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Head-Mounted Display Overview

Figure 1A:
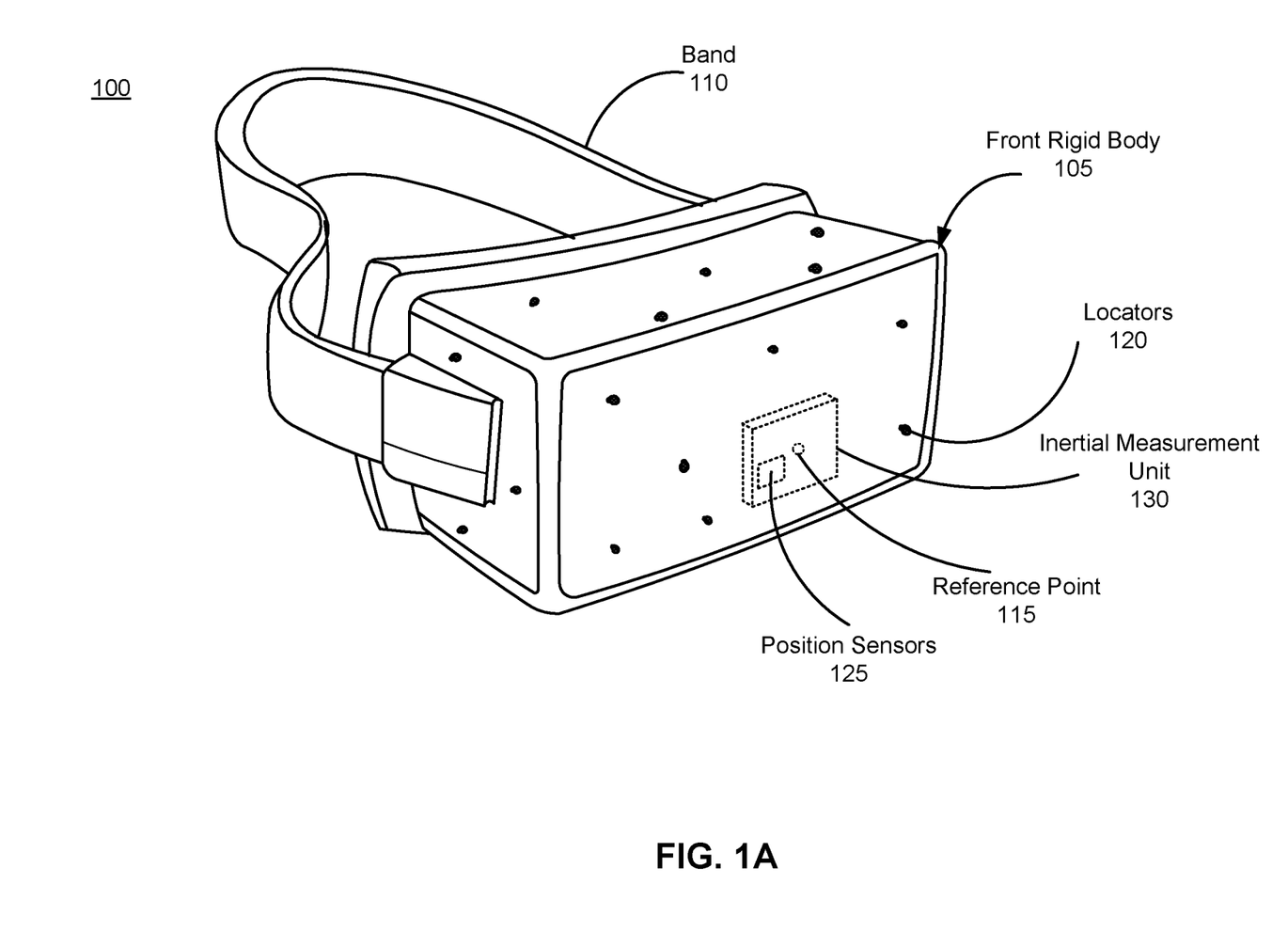
FIG. 1A is a diagram of a head-mounted display, in accordance with an embodiment.

FIG. 1A is a diagram of a head-mounted display (HMD) 100, in accordance with an embodiment. The HMD 100 includes a front rigid body 105 and a band 110. The front rigid body 105 includes an electronic display element of an electronic display (not shown in FIG. 1A), an augmented optics block (not shown in FIG. 1A), a reference point 115, locators 120, one or more position sensors 125, and an inertial measurement unit (IMU) 130. In the embodiment shown by FIG. 1A, the position sensors 125 are located within the IMU 130, and neither the IMU 130 nor the position sensors 125 are visible to a user. In some embodiments, the HMD 100 may act as a virtual reality (VR) headset, an augmented reality (AR) headset, a mixed reality (MR) headset, or some combination thereof. In embodiments that describe AR system environment, the HMD 100 augments views of a physical, real-world environment with computer-generated elements (e.g., images, video, sound, etc.). For example, one or more portions of the HMD 100 may be at least partially transparent. In embodiments that describe MR system environments, the HMD 100 merges views of physical, real-word environment with virtual environment to produce new environments and visualizations where physical and digital objects co-exist and interact in real time. The reference point 115, locators 120, IMU 130, and the position sensors 125 are discussed in detail below with respect to FIG. 3.

Figure 1B:
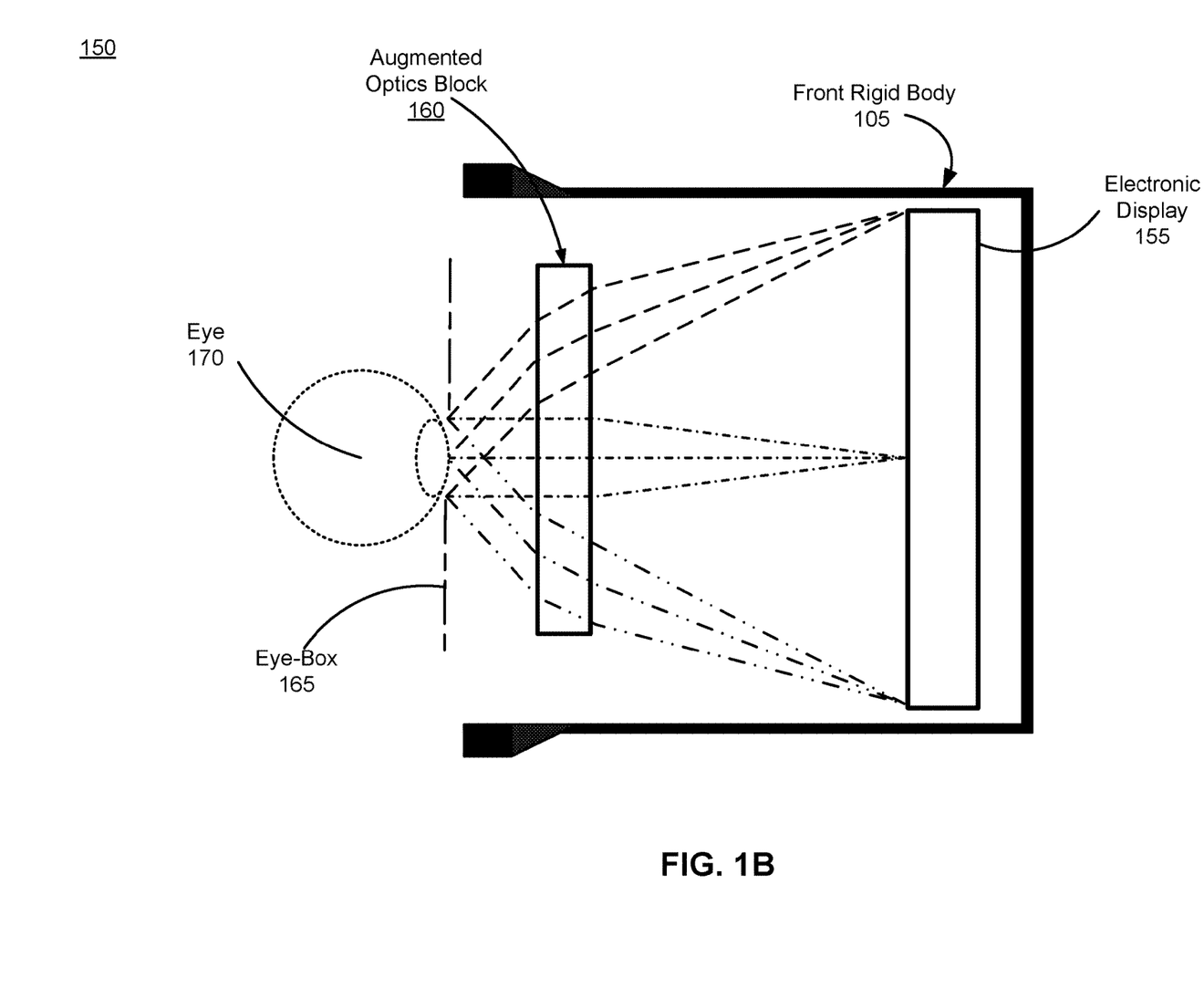
FIG. 1B is a cross section of a front rigid body of the head-mounted display in FIG. 1A, in accordance with an embodiment.

FIG. 1B is a cross section 150 of the front rigid body 105 of the HMD 100 in FIG. 1A, in accordance with an embodiment. As shown in FIG. 1B, the front rigid body 105 includes an electronic display 155 and an augmented optical block 160 that together provide image light to an eye-box 165. The eye-box 165 is a location of the front rigid body 105 where a user's eye 170 is positioned. For purposes of illustration, FIG. 1B shows a cross section 150 associated with a single eye 170, but a separate augmented optical block 160, and/or electronic display element 155 may provide altered image light to another eye of the user. Additionally, the HMD 100 includes an eye tracking unit (not shown). The eye tracking unit may include, e.g., one or more sources that illuminate one or both eyes of the user, and one or more detectors that capture images of one or both eyes of the user.

The electronic display 155 displays images to the user. In various embodiments, the electronic display 155 may comprise a single electronic display or multiple electronic displays (e.g., a display for each eye of a user). Examples of the electronic display 155 include: a liquid crystal display (LCD), an organic light emitting diode (OLED) display, an active-matrix organic light-emitting diode display (AMO-LED), a quantum organic light emitting diode (QOLED) display, a quantum light emitting diode (QLED) display, a transparent organic light emitting diode (TOLED) display, some other display, or some combination thereof.

The augmented optics block 160 magnifies received light from the electronic display 155, corrects optical errors associated with the image light, and delivers the corrected image light to the user of the HMD 100. The augmented optics block 160 includes a composite optical element (not shown), an eye tracking unit (not shown). Additionally, in some embodiments, the augmented optics block 160 may also include a calibration unit (not shown). The composite optical element and the eye tracking unit are discussed in detail below with respect to FIGS. 2A-2D.

A composite optical element performs several functions that may be performed by multiple, separate, optical elements. For example, a composite optical element may act as both a lens (e.g., add or remove optical power to the system) and as a beamsplitter. As such, the composite optical element has a smaller form factor than multiple optical elements that together perform similar functions. This can be important in, e.g., HMDs where weight is minimized to, e.g., increase user comfort. Examples of the composite optical element are further described with respect to FIGS. 2A-2D.

In some embodiments, a composite optical element includes at least two optical components each having an optical power, and a beamsplitter formed by, e.g., a coating on a bonded surface of the two optical components. Examples of the composite optical element are further described with respect to FIGS. 2A-2D. An optical power is defined as a degree to which an optical component converges or diverges light. The optical power of an optical component, for the display path, is roughly equal to the sum of the optical powers of each surface. An optical power can be categorized into two types, e.g., a positive optical power and a negative optical power. An optical component having a positive optical power indicates the optical component converges light. An optical component having a negative optical power indicates the optical component diverges light.

In some embodiments, a composite optical element includes a first optical component having a first optical power, a second optical component having a second optical power, and a beamsplitter. An example of the composite optical element are further described with respect to FIG. 2A. In some embodiments, the first optical power and the second optical power have the same type of optical power (e.g., both the first optical power and the second optical power are positive optical powers or negative optical powers). In some embodiments, the first optical power and the second optical power have a different type of optical power (e.g., the first optical power is a positive optical power, and the second optical power is a negative optical power, or vice versa).

The first optical component and the second optical component may be bonded with an optical index matching adhesive (e.g., Norland® UV curing adhesives, or other suitable optical adhesives). The bonding provides for both a mechanical joint and minimal light loss at the bonded surface. In some embodiments, the first optical component and the second optical component may be manufactured by a mold. For example, a plastic mold may produce two halves of a lens.

A beamsplitter is coated on a surface where first optical component and the second optical component are bonded. The bonded surface allows for the beamsplitter coating to be more easily applied on the optical components than, e.g., a coating on a separate component, such as a dielectric mirror (e.g., hot mirror).

A beamsplitter transmits light within a first band and reflects light within a second band. This type of beamsplitter may be referred to as a two-way beamsplitter. For example, the beamsplitter may transmit light within a visible band (e.g., 400-700 nanometers (nm)), and may reflect light within an infrared band (e.g., above 780 nm). Additionally, the beamsplitter may transmit light within a first visible band and may reflect light within a second visible band. The first visible band is separate from the second visible band. Alternatively, the beamsplitter may transmit light within a first infrared band and may reflect light within a second infrared band. The first infrared band is separate from the second infrared band.

In some embodiments, a beamsplitter transmits light within a first band, reflects light within a second band, and reflects light within a third band. An example of a beamsplitter for three ways is further described in FIG. 2D. For example, the beamsplitter may transmit light within a first visible band, reflect light within a second visible band, and may reflect light within an infrared band. In some embodiments, the beamsplitter may transmit light within an infrared band, reflect light within a first visible band, and may reflect light within a second band. Additionally, the beamsplitter may transmit light within a first visible band, reflect light within a second visible band, and may reflect light within a third visible band. The first, the second and the third visible band are separate from each other. Alternatively, the beamsplitter may transmit light within a first infrared band, reflect light within a second infrared band, and may reflect light within a third infrared band. The first, the second and the third infrared band are separate from each other.

In some embodiments, a beamsplitter may preserve polarization of light when the beamsplitter transmits and/or reflects light within one or more bands. For example, the beamsplitter may preserve polarization of light when the beamsplitter transmits and/or reflects light within an infrared band. In some embodiments, a beamsplitter may transmit light within one or more bands independently of polarization. For example, the beamsplitter may transmit light within a visible band independently of polarization. In some embodiments, a beamsplitter may partially reflect and/or transmit light within one or more bands based on a split in polarization. For example, a beamsplitter may partially reflect P-polarized light that has an electric field polarized parallel to an incidence plane, and partially transmit S-polarized light that has an electronic field polarized perpendicular to the incidence plane. These above embodiments may be applied to, e.g., a two-way beamsplitter or a three-way beamsplitter.

In some embodiments, the composite optical element includes one or more additional optical components each having a respective optical power. Examples of the composite optical element are further described with respect to FIGS. 2B-2D. For example, the composite optical element includes a third optical component having a third optical power. The third optical power may have the same type (e.g., positive) as the first or the second optical component. Alternatively, the third optical power may have different type from the first optical component or the second optical component. The third optical component and the first optical component, or the second optical component, or each of the first optical component and the second optical component be bonded with an optical index matching adhesive (e.g., Norland® UV curing adhesives, or other suitable optical adhesives.

In some embodiments, the composite optical element directs light reflected from the eye 170 to the eye tracking unit, and/or directs light from the eye tracking unit to the eye 170. In some embodiments, the composite optical element also magnifies received visible image light from the electronic display 155, corrects optical errors associated with the visible light image light, and delivers the corrected visible image light to the user of the HMD 100.

Magnification of the image light by the composite optical element allows the electronic display 155 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the composite optical element is designed so its effective focal length is larger than the spacing to the electronic display 155, which magnifies the image light projected by the electronic display 155.

The composite optical element may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 155 for display is pre-distorted, and the composite optical element corrects the distortion when it receives image light from the electronic display 155 generated based on the content.

The eye tracking unit tracks a user's eye movement. Some or all of the eye tracking unit may or may not be in a line of sight of a user wearing the HMD 100. The eye tracking unit is typically located off-axis to avoid obstructing the user's view of the electronic display 155, although the eye tracking unit may alternately be placed elsewhere. Also, in some embodiments, there is at least one eye tracking unit for the user's left eye and at least one tracking unit for the user's right eye. In some embodiments, only one eye tracking unit may track both the left and right eye of the user.

The eye tracking unit may include one or more detectors, a controller, and in some embodiments, one or more illumination sources. The eye tracking unit determines eye tracking information using data (e.g., images) captured by the detector of a user's eye. Eye tracking information describes a position of an eye of the user. Eye tracking information may include, e.g., gaze angle, eye orientation, inter-pupillary distance, some other metric associated with tracking an eye, or some combination thereof. Some embodiments of the eye tracking unit have different components than those described in FIG. 1B. Examples of the eye tracking unit are further described with respect to FIGS. 2A-2C.

An illumination source (also referred to as illuminator) illuminates a portion of the user's eye 170 with light. The predetermined illumination power is less than a threshold that causes injury to the eye 170. The illumination source may be an infrared light source. Examples of infrared light sources include: a laser (e.g., a tunable laser, a continuous wave laser, a pulse laser, other suitable laser emitting infrared light), a light emitted diode (LED), a fiber light source, another other suitable light source emitting infrared and/or visible light, or some combination thereof. In various embodiments, the illumination source may emit visible light. In some embodiments, the eye tracking unit may include multiple illumination sources for illuminating one or more illuminated portions of the eye 170. In some embodiments, the light emitted from the one or more illumination sources is a structured light pattern.

A detector detects reflected and/or scattered light from the illuminated portion of the eye. The detector outputs a detection signal proportional to the detected light. The detection signal corresponds to a reflectance of the illuminated portion of the eye which correlates with an apparent contrast change (e.g., a contrast change of corneal reflection) through the illuminated portion of the user's eye 170. The detector is a device that converts light into electronic signals. The spectral sensitivity of the detector may be in an infrared band or a visible band depending on the illumination source. In some embodiments, the detector may be based on single-point detection (e.g., photodiode, balanced/matched photodiodes, or avalanche photodiode), or based on one or two-dimensional detector arrays (e.g., a camera, linear photodiode array, CCD array, or CMOS array). In some embodiments, the eye tracking unit may include multiple detectors to capture light reflected from one or more illuminated portions of the eye 170.

The controller determines eye tracking information using data (e.g., captured images) from the one or more detectors. For example, in some embodiments, the controller identifies locations of reflections of light from the one or more illumination sources in an image of the eye of the user, and determines a position and orientation of the eye based on the shape and/or locations of the identified reflections. In cases where the eye is illuminated with a structured light pattern, the controller can detect distortions of the structured light pattern projected onto the eye, and estimate a position and orientation of the eye based on the detected distortions. The controller can also estimate a pupillary axis, a gaze angle (e.g., corresponds to a foveal axis), a translation of the eye, a torsion of the eye, and a current shape of the eye based on the image of the illumination pattern captured by the camera.

In some embodiment, the augmented optics block 160 may additionally include one or more additional optical elements. Examples of optical elements include an aperture, a Fresnel lens, a convex lens, a concave lens, a filter, or any other suitable optical element that affects the image light emitted from the electronic display 155. For example, one or more optical elements may be placed between the composite optical element and the electronic display 155 to adjust an amount of magnification. Moreover, the augmented optics block 160 may include combinations of different optical elements. In various embodiments, one or more of the optical elements in the augmented optics block 160 may have one or more coatings, such as partial reflectors or anti-reflective coatings.

Examples of an Augmented Optics Block

Figure 2A:
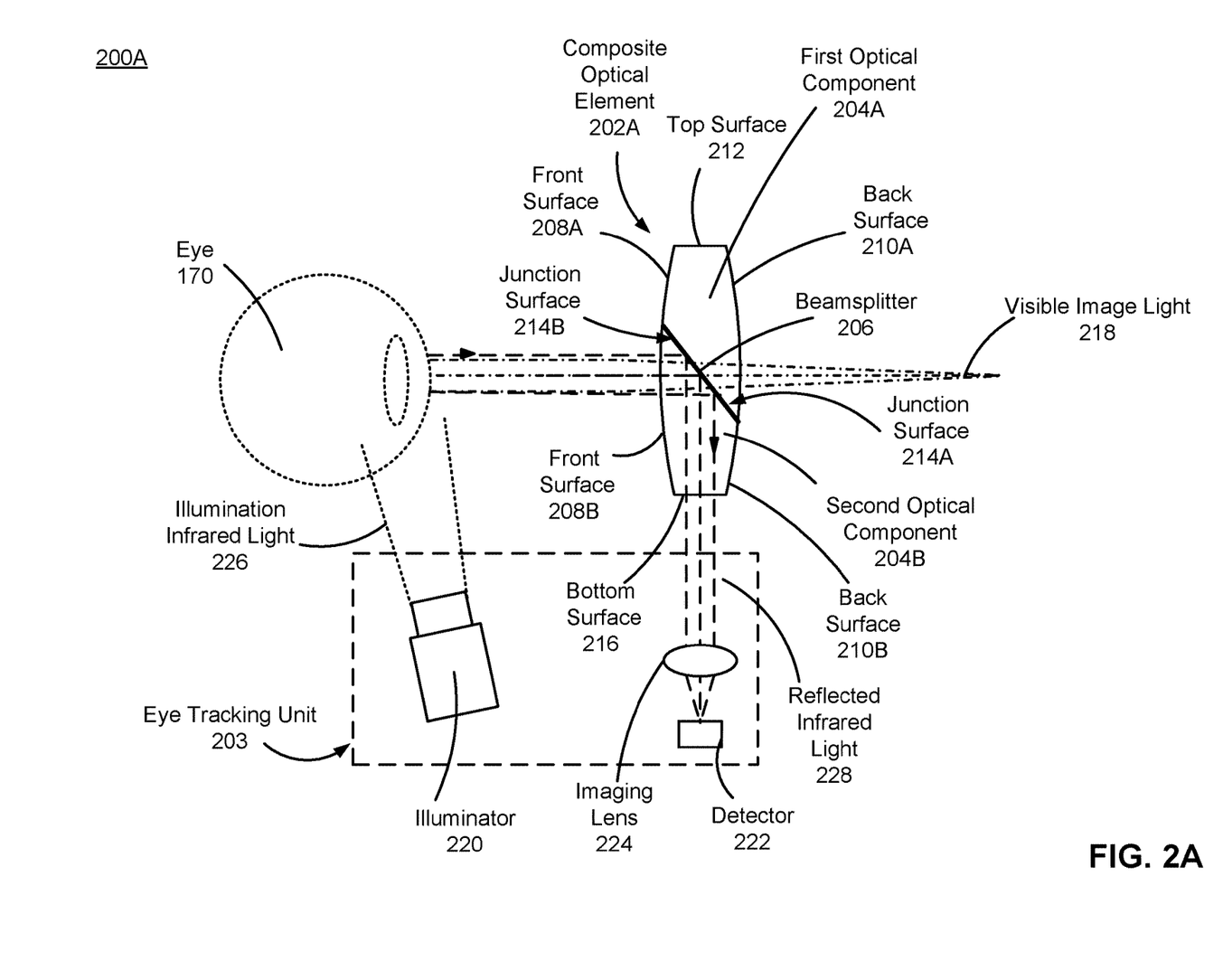
FIG. 2A is a block diagram of an augmented optics block in a head-mounted display, in accordance with an embodiment.

FIG. 2A is a block diagram of an augmented optics block 200A, in accordance with an embodiment. In the example of FIG. 2A, the augmented optics block 200A includes a composite optical element 202A and an eye tracking unit 203. The composite optical element 202A includes a first optical component 204A, a second optical component 204B, and a beamsplitter 206.

The first optical component 204A and the second optical component 204B are respective portions of the composite optical element 202A. The first optical component 204A and the second optical component 204B are composed of materials that are substantially transparent to light from an electronic display and/or an eye tracking unit. In some embodiments, the first optical component 204A and/or the second optical component 204B may be composed of, e.g., glass, plastic, ceramic, or some combination thereof some other material that is substantially transparent to light from an electronic display and/or an eye tracking unit, or some combination thereof.

The first optical component 204A includes at least a front surface 208A, a back surface 210B, a top surface 212 (also referred to as an end surface), and a junction surface 214A. Similarly, the second optical component 204 B, includes at least a front surface 208B, a back surface 210B, a junction surface 214B, and a bottom surface 216 (also referred to as an end surface). The first optical component 204A and the second optical component 204B are coupled together at their respective junction surfaces to form the composite optical element 202A. One or both of the junction surfaces 214A, 214B may be coated with a coating to form the beamsplitter 206. As discussed above, the coating may, e.g., reflect IR light and transmit visible light.

The front surface 208A and the front surface 208B together form a first surface of the composite optical element 202A, and the back surface 210A and the back surface 210B form a second surface of the composite optical element 202A. Note that in this embodiment the first surface and the second surface form a bi-convex lens. In alternate embodiments, not illustrated, the first surface and/or the second surface may have some other surface profile. For example, the first surface and/or the second surface may have a concave surface profile, an aspheric, a Fresnel surface, a freeform surface profile, or some other surface profile. In this manner a composite optical element may be formed to act as, e.g., a converging lens, a diverging lens, a meniscus lens, etc.

In some embodiments, one or more of the surfaces (e.g., the first surface and/or the second surface of the composite optical element 202A) may have one or more coatings, such as partial reflectors, anti-reflective coatings, high-reflection coatings, or light blocking coatings. For example, the first surface and/or the second surface of the composite optical element 202A shown in FIG. 2A may have an anti-reflective coating to reduce reflection of incident lights, and, e.g., the top surface 212 may have a light blocking coating to block incident lights.

As shown in FIG. 2A, the first surface and the second surface have a positive optical power. This combination may magnify visible image light 218 from an electronic display (not shown), for example, the electronic display is located between the composite optical element 202A and a focal point of the composite optical element 202A. The combination may also correct optical errors associated with the visible image light 218, and delivers the corrected visible image light to the eye 170. The beamsplitter 206 transmits the visible image light 218 from the electronic display (not shown) to the user's eye 170.

As shown in FIG. 2A, the eye tracking unit 203 includes an illuminator 220, a detector 222 and an imaging lens 224. The illuminator 220 illuminates a portion of the eye 170 and overall larger volume around the eye using infrared light 226 (shown in dotted lines). The beamsplitter 206 directs the infrared light 228 (shown in dashed lines) reflected and\or scattered from the illuminated portion of the eye 170 through the bottom surface 216 to the eye tracking unit 203. In this embodiment, the bottom surface 216 and the top surface 212 have a flat surface profile. However, in other embodiments, the bottom surface 216 and/or the top surface 212 may have some other surface profile (e.g., convex, concave, freeform, Fresnel, etc.). The imaging lens 224 focuses the reflected infrared light 228 onto the detector 222.

The single composite optical element 202A performs several functions that are performed by multiple, separate, optical elements. For example, the composite optical element 202A acts as a converging lens and a beamsplitter to direct visible image light 218 from the display (not shown) to the eye 170 and to direct the reflected infrared light 228 to the eye tracking unit 203. As such, the composite optical element 202A has a smaller form factor than multiple optical elements that together perform similar functions.

Figure 2B:
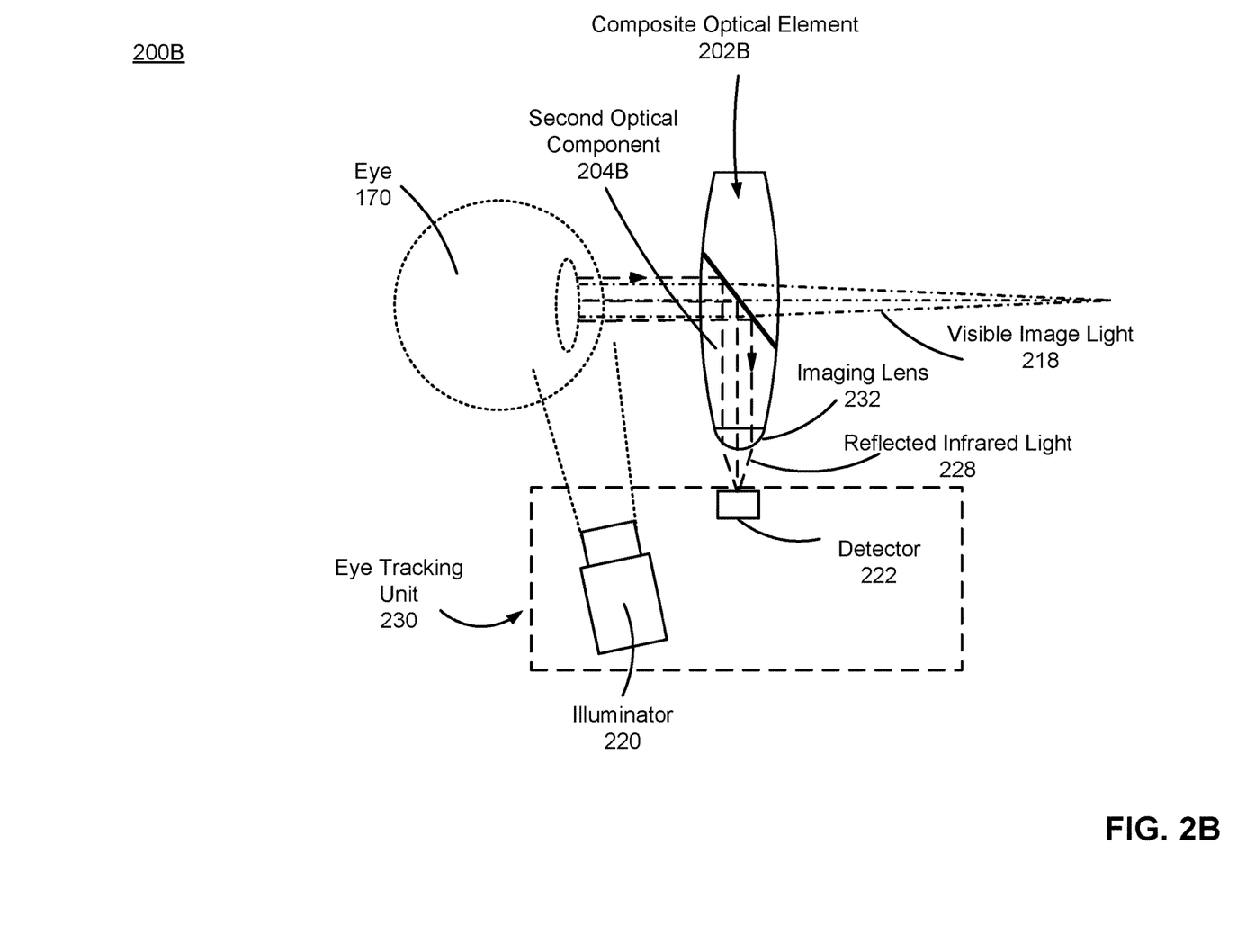
FIG. 2B is a block diagram of an augmented optics block including an imaging lens, in accordance with an embodiment.

FIG. 2B is a block diagram of an augmented optics block 200B that includes an imaging lens 232, in accordance with an embodiment. The augmented optics block 200B includes a composite optical element 202B and an eye tracking unit 230. The eye tracking unit 230 is substantially the same as the eye tracking unit 203 except that it does not include the imaging lens 224. And the composite optical element 202B is substantially the same as the composite optical element 202A except that it additionally includes the imaging lens 232 that is coupled to the bottom surface 216 (also referred to as an end surface). As such, an imaging lens (e.g., the imaging lens 224) in the eye tracking unit 203 may be omitted. A distance between the composite optical element 202B and the detector 222 is determined by, e.g., the focusing length of the imaging lens 232. This can result in a smaller eye tracking unit 230. The imaging lens 232 and the second optical component 204B may be bonded with an optical index matching adhesive (e.g., Norland® UV curing adhesives, or other suitable optical adhesives). The bonding provides for both a mechanical joint and minimal light loss at the bonded surface. The imaging lens 232 has functions similar to the imaging lens 224. The imaging lens 232 focuses the infrared light 228 reflected and\or scattered from the illuminated portion of the eye 170 onto the detector 222. As discussed above, the eye tracking unit 230 uses the detected infrared light to estimate eye's position and orientation. In alternate embodiments, the imaging lens 232 may still be coupled with a smaller (less elements otherwise) imaging lens 224 in front of the detector 222. In this manner, the system can leverage the surface of the second optical component 204B to improve imaging performance in an overall smaller package.

Figure 2C:
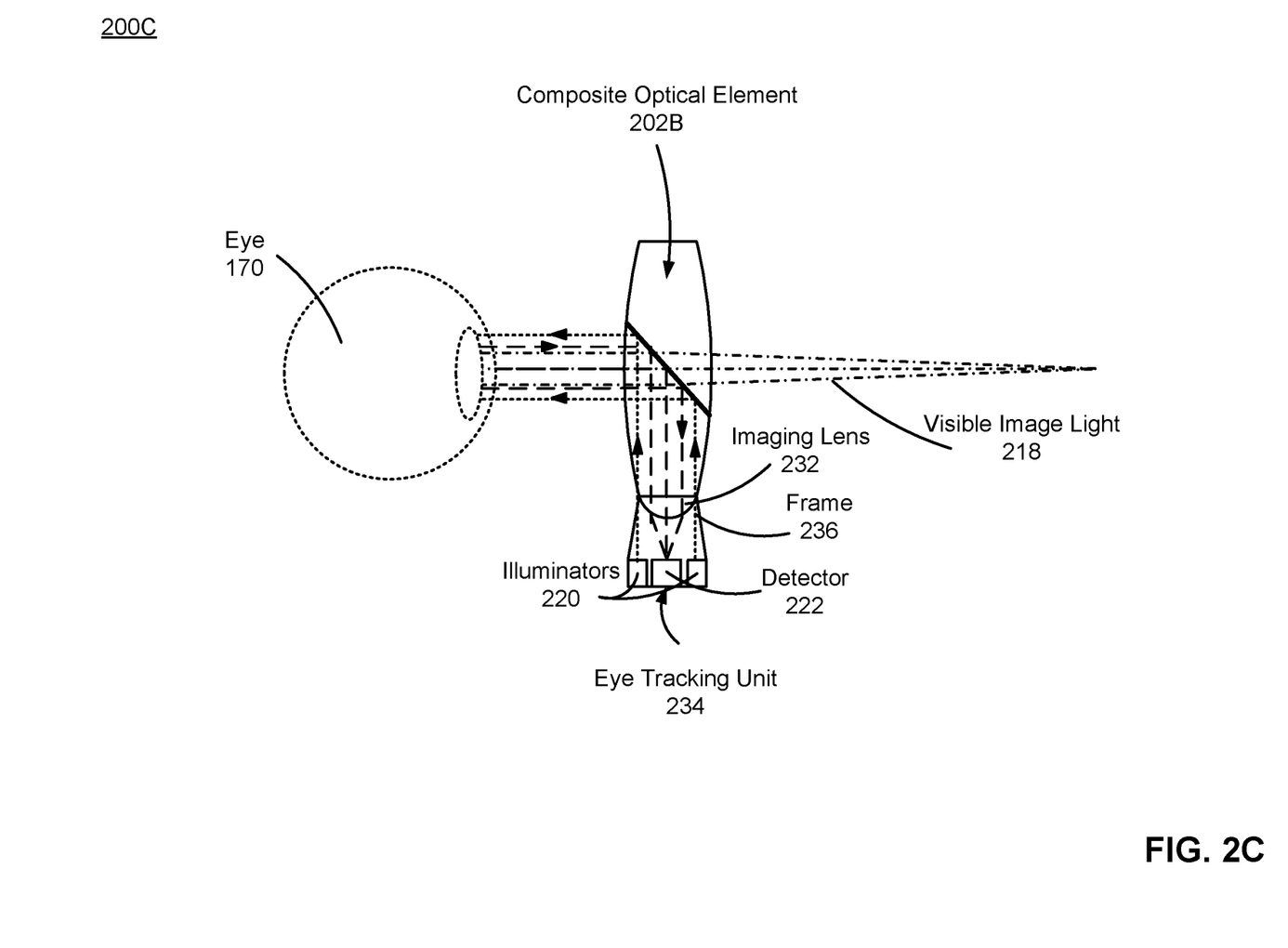
FIG. 2C is a block diagram of an augmented optics block including an imaging lens and a frame, in accordance with an embodiment.

FIG. 2C is a block diagram of an augmented optics block 200C including the imaging lens 232 and a frame 236, in accordance with an embodiment. The augmented optics block 200C is substantially the same as the augmented optics block 200B, except that an eye tracking unit 234 is coupled to the composite optical element 202B via the frame 236. The eye tracking unit 234 includes one or more illuminators 220 and one or more detectors 222. As shown in FIG. 2C, the illuminators 220 form a ring of illuminators surrounding the detector 222. In alternate embodiments, the eye tracking unit 234 may include multiple detectors mixed with multiple illuminators in a pattern. In alternate embodiments, the eye tracking unit 234 includes a detector 222 but does not include any illuminators 220. For example, the detector 222 may be a camera or some other type of detector that can track eye orientation with or without using a dedicated illumination source (for instance using visible light from the display). The eye tracking unit 234 is integrated with the composite optical element 202B via the frame 236 to form the augmented optics block 200C. The frame 236 may be rigid or flexible. Examples of frames include, but not limited to: trusses, and frame mount.

As shown in FIG. 2C, the eye tracking unit 234 is placed on a focusing plane of the imaging lens 232. The composite optical element 202B delivers reflected infrared light (as shown in dashed lines) from the eye 170 to the detector 222, and also transmits illumination infrared light (as shown in dotted lines) from the illuminator 220 to the eye 170. In some embodiments, an optical element (not shown in FIG. 2C) placed before the detector 222 may separate the reflected infrared light from the illumination infrared light. Examples of an optical element to filter out the illumination light includes, but not limited to an optical filter, an optical reflective or absorptive polarizer, or a prism. The use of the frame 236 allows for modular integration of the eye tracking unit 234 into the composite optical element 202B to form an augmented optics block 200C that has a small form factor relative to, e.g., the augmented optics block 200A.

Figure 2D:
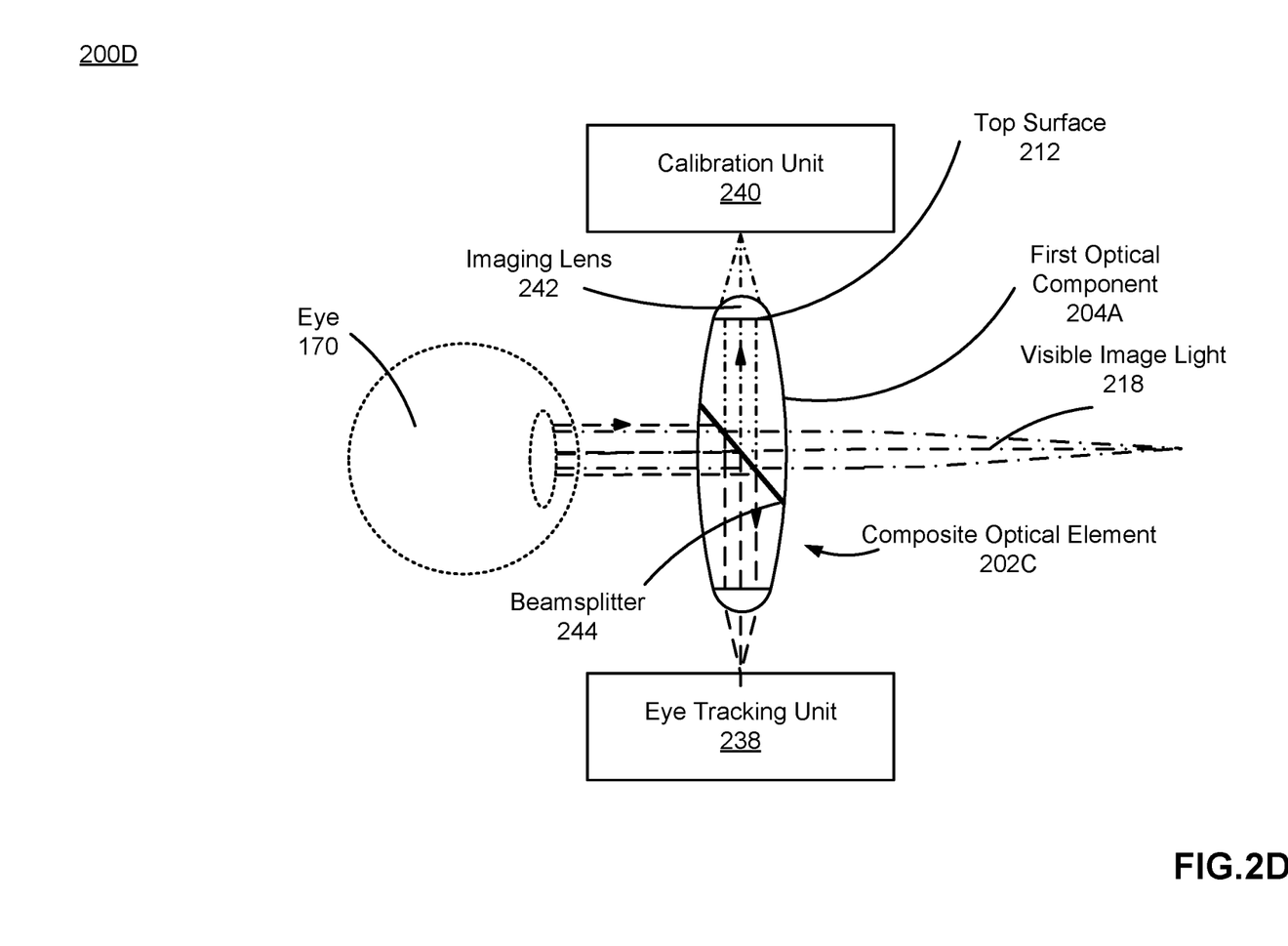
FIG. 2D is a block diagram of an augmented optics block including multiple imaging lenses, in accordance with an embodiment.

FIG. 2D is a block diagram of an augmented optics block 200D including multiple imaging lenses, in accordance with an embodiment. The augmented optics block 200D includes a composite optical element 202C, an eye tracking unit 238, and a calibration unit 240. The composite optical element 202C is substantially the same as the composite optical element 202B, except that a top surface 212 (also referred to as an end surface) of the first optical component 204A is coupled to an imaging lens 242. The imaging lens 242 and the first optical component 204A may be coupled together by, e.g., bonding with an optical index matching adhesive (e.g., Norland® UV curing adhesives, or other suitable optical adhesives). The bonding provides for both a mechanical joint and minimal light loss at the bonded surface. The eye tracking unit 238 may be, e.g., the eye tracking unit 230 or 234.

Compared with the beamsplitter 206 in FIGS. 2A-2C, a beamsplitter 244 additionally reflects a portion of the visible image light 218 and/or infrared illumination (which can be part of the eye tracking unit 238) to the calibration unit 240. The imaging lens 242 focuses the visible image light 218 (as shown in dot-dashed lines) from the display (not shown) onto a calibration unit 240. The calibration unit 240 collects the visible image light to calibrate brightness levels, colors of corresponding pixels included in the electronic display, correct for optical aberrations, or some combination thereof. In some embodiments, the composite optical element 202C may be mounted with a detector included in the calibration unit 240 via a frame (e.g., similar to the frame 236 discussed with respect to FIG. 2C).

The composite optical element 202C enables an HMD 100 to have more room for placing the calibration unit 240 or possibly some other module in place of the calibration unit 240. For example, the calibration unit 240 could be replaced with a second display, another eye tracking system, a light baffling system, etc.

In some embodiments, one or more optical elements (not shown in FIGS. 2A-2D) may be placed between the composite optical element (e.g., 202A, 202B, 202C) and a display (not shown) to adjust visible image light 218 received by the eye 170. For example, an optical element may shorten a distance between the eye 170 and the display to increase a field of view of the eye 170. An optical element may reduce distortion or noise of the visible image light received by the eye 170. Examples of an optical element include an aperture, a Fresnel lens, a convex lens, a concave lens, a filter, or any other suitable optical element that affects the image light emitted from the display.

In some embodiments, one or more optical elements (not shown in FIGS. 2A-2D) may be placed between the eye 170 and the composite optical element (e.g., 202A, 202B, 202C). For example, the one or more optical elements may apply optical correction or otherwise affect the image light 218. For example, a set of optical elements each having a different optical power may be placed between the eye 170 and the composite element to compensate for astigmatism.

Example of an Augmented Optics Block in a Head-Mounted Display System

Figure 3:
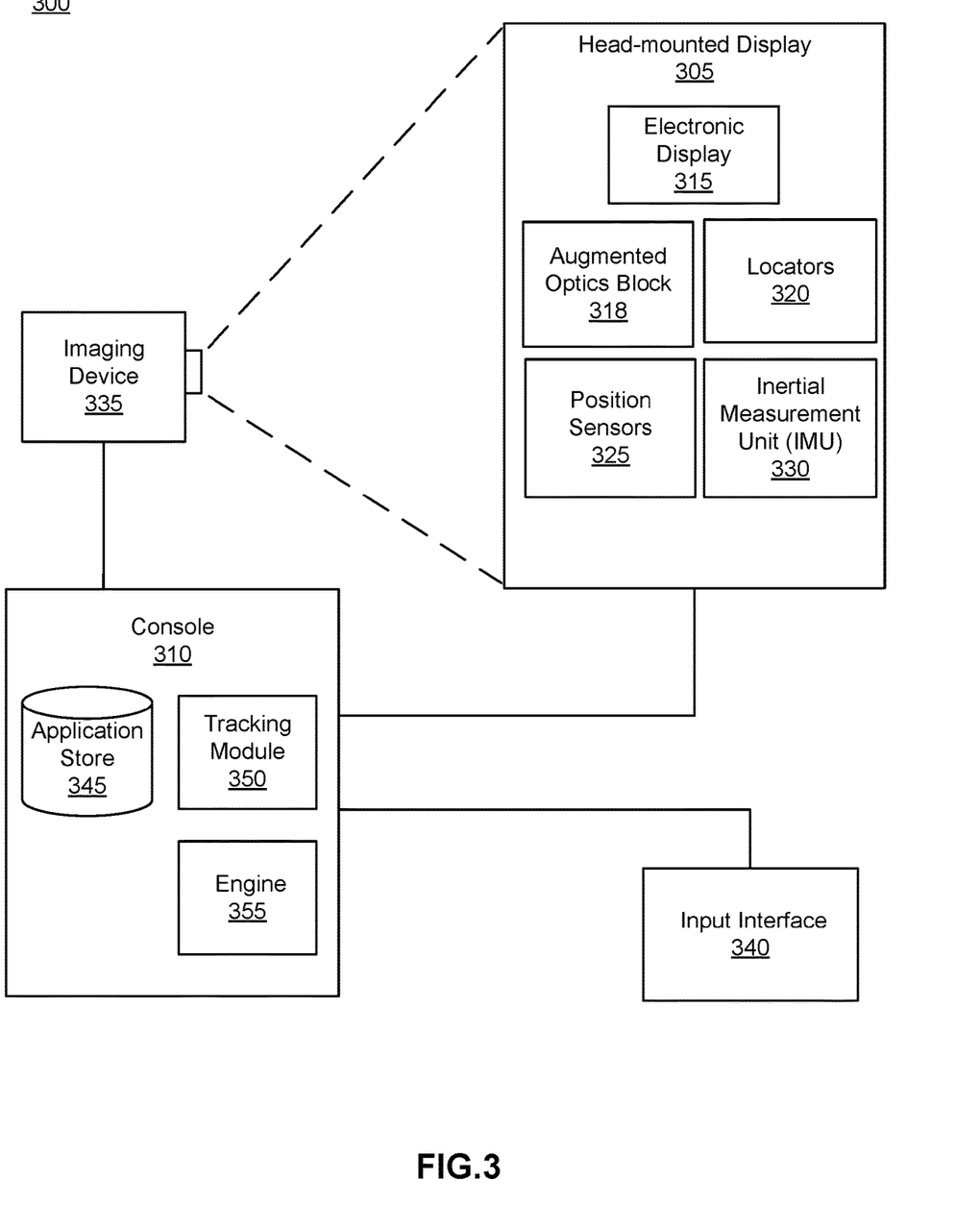
FIG. 3 is a block diagram of a system environment including an HMD with an augmented optics block, in accordance with an embodiment.

FIG. 3 is a block diagram of a system 300 in which an HMD 305 operates. The system 300 shown by FIG. 3 comprises a HMD 305, an imaging device 335, and an input interface 340 that are each coupled to the console 310. While FIG. 3 shows an example system 300 including one HMD 305, one imaging device 335, and one input interface 340, in other embodiments any number of these components may be included in the system 300. For example, there may be multiple HMDs 305 each having an associated input interface 340 and being monitored by one or more imaging devices 335, with each HMD 305, input interface 340, and imaging devices 335 communicating with the console 310. In alternative configurations, different and/or additional components may be included in the system 300. Similarly, functionality of one or more of the components can be distributed among the components in a different manner than is described here. For example, some or all of the functionality of the console 310 may be contained within the HMD 305. The system 300 may operate in a VR system environment, an AR system environment, a MR system environment, or some combination thereof.

The HMD 305 presents content to a user. In some embodiments, the HMD 305 is the HMD 100. Examples of content presented by the HMD 305 include one or more images, video, audio, or some combination thereof. In some embodiments, audio is presented via an external device (e.g., speakers and/or headphones) that receives audio information from the HMD 305, the console 310, or both, and presents audio data based on the audio information. The HMD 305 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 305 may present VR, AR, MR, or some combination thereof to a user. In the AR and/or MR embodiments, the HMD 305 may augment views of a physical, real-world environment with computer-generated elements (e.g., images, video, sound, etc.).

The HMD 305 includes an electronic display 315, an augmented optics block 318, one or more locators 320, one or more position sensors 325, and an inertial measurement unit (IMU) 330. Some embodiments of the HMD 305 have different components than those described here. Similarly, the functions can be distributed among other components in the system 300 in a different manner than is described here. For example, some of the functions of the augmented optics block 318 may be performed by the console 310. The electronic display 315 displays images to the user in accordance with data received from the console 310.

The augmented optics block 318 includes a composite optical element and an eye tracking unit. Examples of the composite optical element and the eye tracking unit are described with respect to FIGS. 1-2D.

The composite optical element magnifies received light from the electronic display 315, corrects optical errors associated with the image light, and delivers the corrected image light is presented to a user of the HMD 305. The composite optical element also directs light reflected from a user's eye to the eye tracking unit, and/or directs light from the eye tracking unit to the user's eye.

The eye tracking unit tracks a user's eye movement. The eye tracking unit includes a light source to project light onto a portion of the user's eye, and a detector to collect reflected and/or scattered light from the illuminated portion of the eye. The eye tracking unit uses the tracked eye movement to determine one or more characterization parameters. Based on the detected eye movement, the eye tracking unit communicates with the console 310 for further processing.

In some embodiments, the eye tracking unit allows a user to interact with content presented to the user by the console 310 based on the detected eye movement. Example interactions by the user with presented content include: selecting a portion of content presented by the console 310 (e.g., selecting an object presented to the user), movement of a cursor or a pointer presented by the console 310, navigating through content presented by the console 310, presenting content to the user based on a gaze location of the user, or any other suitable interaction with content presented to the user.

In some embodiments, the augmented optics block 318 includes one or more additional optical elements. Examples of the optical element include an aperture, a Fresnel lens, a convex lens, a concave lens, reflective element, a filter, or any other suitable optical element that affects the image light emitted from the electronic display 315. Moreover, the augmented optics block 318 may include combinations of different optical elements. In some embodiments, one or more of the optical elements in the augmented optics block 318 may have one or more coatings, such as partial reflectors or anti-reflective coatings.

The locators 320 are objects located in specific positions on the HMD 305 relative to one another and relative to a specific reference point on the HMD 305. A locator 320 may be a light emitting diode (LED), a corner cube reflector, a reflective marker, a type of light source that contrasts with an environment in which the HMD 305 operates, or some combination thereof. In embodiments where the locators 320 are active (i.e., an LED or other type of light emitting device), the locators 320 may emit light in the visible band (~380 nm to 750 nm), in the infrared (IR) band (~750 nm to 1700 nm), in the ultraviolet band (200 nm to 380 nm), some other portion of the electromagnetic spectrum, or some combination thereof.

In some embodiments, the locators 320 are located beneath an outer surface of the HMD 305, which is transparent to the wavelengths of light emitted or reflected by the locators 320 or is thin enough not to substantially attenuate the wavelengths of light emitted or reflected by the locators 320. Additionally, in some embodiments, the outer surface or other portions of the HMD 305 are opaque in the visible band of wavelengths of light. Thus, the locators 320 may emit light in the IR band under an outer surface that is transparent in the IR band but opaque in the visible band.

The IMU 330 is an electronic device that generates fast calibration data based on measurement signals received from one or more of the position sensors 325. A position sensor 325 generates one or more measurement signals in response to motion of the HMD 305. Examples of position sensors 325 include: one or more accelerometers, one or more gyroscopes, one or more magnetometers, another suitable type of sensor that detects motion, a type of sensor used for error correction of the IMU 330, or some combination thereof. The position sensors 325 may be located external to the IMU 330, internal to the IMU 330, or some combination thereof.

Based on the one or more measurement signals from one or more position sensors 325, the IMU 330 generates fast calibration data indicating an estimated position of the HMD 305 relative to an initial position of the HMD 305. For example, the position sensors 325 include multiple accelerometers to measure translational motion (forward/back, up/down, left/right) and multiple gyroscopes to measure rotational motion (e.g., pitch, yaw, and roll). In some embodiments, the IMU 330 rapidly samples the measurement signals and calculates the estimated position of the HMD 305 from the sampled data. For example, the IMU 330 integrates the measurement signals received from the accelerometers over time to estimate a velocity vector and integrates the velocity vector over time to determine an estimated position of a reference point on the HMD 305. Alternatively, the IMU 330 provides the sampled measurement signals to the console 310, which determines the fast calibration data. The reference point is a point that may be used to describe the position of the HMD 305. While the reference point may generally be defined as a point in space; however, in practice the reference point is defined as a point within the HMD 305 (e.g., a center of the IMU 130).

The IMU 330 receives one or more calibration parameters from the console 310. As further discussed below, the one or more calibration parameters are used to maintain tracking of the HMD 305. Based on a received calibration parameter, the IMU 330 may adjust one or more IMU parameters (e.g., sample rate). In some embodiments, certain calibration parameters cause the IMU 330 to update an initial position of the reference point so it corresponds to a next calibrated position of the reference point. Updating the initial position of the reference point at the next calibrated position of the reference point helps reduce accumulated error associated with the determined estimated position. The accumulated error, also referred to as drift error, causes the estimated position of the reference point to "drift" away from the actual position of the reference point over time.

The imaging device 335 generates slow calibration data in accordance with calibration parameters received from the console 310. Slow calibration data includes one or more images showing observed positions of the locators 320 that are detectable by the imaging device 335. The imaging device 335 may include one or more cameras, one or more video cameras, any other device capable of capturing images including one or more of the locators 320, or some combination thereof. Additionally, the imaging device 335 may include one or more hardware and software filters (e.g., used to increase signal to noise ratio). The imaging device 335 is configured to detect light emitted or reflected from locators 320 in a field of view of the imaging device 335. In embodiments where the locators 320 include passive elements (e.g., a retroreflector), the imaging device 335 may include a light source that illuminates some or all of the locators 320, which retro-reflect the light towards the light source in the imaging device 335. Slow calibration data is communicated from the imaging device 335 to the console 310, and the imaging device 335 receives one or more calibration parameters from the console 310 to adjust one or more imaging parameters (e.g., focal length, focus, frame rate, ISO, sensor temperature, shutter speed, aperture, etc.).

The input interface 340 is a device that allows a user to send action requests to the console 310. An action request is a request to perform a particular action. For example, an action request may be to start or end an application or to perform a particular action within the application. The input interface 340 may include one or more input devices. Example input devices include: a keyboard, a mouse, a game controller, or any other suitable device for receiving action requests and communicating the received action requests to the console 310. An action request received by the input interface 340 is communicated to the console 310, which performs an action corresponding to the action request. In some embodiments, the input interface 340 may provide haptic feedback to the user in accordance with instructions received from the console 310. For example, haptic feedback is provided when an action request is received, or the console 310 communicates instructions to the input interface 340 causing the input interface 340 to generate haptic feedback when the console 310 performs an action.

The console 310 provides content to the HMD 305 for presentation to the user in accordance with information received from one or more of: the imaging device 335, the HMD 305, the input interface 340, and the eye tracking unit included in the augmented optics block 318. In the example shown in FIG. 1, the console 310 includes an application store 345, a tracking module 350, and an engine 355. Some embodiments of the console 310 have different modules than those described in conjunction with FIG. 1. Similarly, the functions further described below may be distributed among components of the console 310 in a different manner than is described here.

The application store 345 stores one or more applications for execution by the console 310. An application is a group of instructions, that when executed by a processor, generates content for presentation to the user. Content generated by an application may be in response to inputs received from the user via movement of the HMD 305, the input interface 340, or the eye tracking unit included in the augmented optics block 318. Examples of applications include: gaming applications, conferencing applications, video playback application, or other suitable applications.

The tracking module 350 calibrates the system 300 using one or more calibration parameters and may adjust one or more calibration parameters to reduce error in determination of the position of the HMD 305. For example, the tracking module 350 adjusts the focus of the imaging device 335 to obtain a more accurate position for observed locators on the HMD 305. Moreover, calibration performed by the tracking module 350 also accounts for information received from the IMU 330. Additionally, if tracking of the HMD 305 is lost (e.g., the imaging device 335 loses line of sight of at least a threshold number of the locators 320), the tracking module 350 re-calibrates some or all of the system 300.

The tracking module 350 tracks movements of the HMD 305 using slow calibration information from the imaging device 335. The tracking module 350 determines positions of a reference point of the HMD 305 using observed locators from the slow calibration information and a model of the HMD 305. The tracking module 350 also determines positions of a reference point of the HMD 305 using position information from the fast calibration information. Additionally, in some embodiments, the tracking module 350 may use portions of the fast calibration information, the slow calibration information, or some combination thereof, to predict a future location of the HMD 305. The tracking module 350 provides the estimated or predicted future position of the HMD 305 to the engine 355.

The engine 355 executes applications within the system 300 and receives position information, acceleration information, velocity information, predicted future positions, or some combination thereof of the HMD 305 and eye tracking unit included in the augment optics block 318 from the tracking module 350. Based on the received information, the engine 355 determines content to provide to the HMD 305 for presentation to the user. For example, if the received information indicates that the user has looked to the left, the engine 355 generates content for the HMD 305 that mirrors the user's movement in a virtual environment. Similarly, if information received from the eye tracking unit indicates the user gazing on a location, the engine 355 generates content based on the identified gazing location, such as a visual representation of the scene at the gazing location with an original display resolution and surrounding scenes with a reduced display resolution. Additionally, in some embodiments, if the received information indicates that tracking of the eye tracking unit is lost, the engine 355 generates content indicating the HMD 305 is to be adjusted for presentation by the HMD 305. Additionally, the engine 355 performs an action within an application executing on the console 310 in response to an action request received from the input interface 340, or the eye tracking unit and provides feedback to the user that the action was performed. The provided feedback may be visual or audible feedback via the HMD 305 or haptic feedback via the input interface 340. For example, the engine 355 receives an action from the eye tracking unit to open an application, so the engine 355 opens the application and presents content from the application to the user via the HMD 305.

In some embodiments, the engine 355 can be configured to utilize, in association with the console 310 and the HMD 305, the eye tracking information obtained from the eye tracking unit for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking unit, the engine 355 determines resolution of the content provided to the HMD 305 for presentation to the user on the electronic display 315. The engine 355 provides the content to the HMD 305 having a maximum pixel density (maximum resolution) on the electronic display 315 in a foveal region of the user's gaze, whereas the engine 355 provides a lower pixel resolution in other regions of the electronic display 315, thus achieving less power consumption at the HMD 305 and saving computing cycles of the console 310 without compromising a visual experience of the user. In some embodiments, the engine 355 can be configured to optimize the performance of other components of the augment optics block 318 of the HMD 305 based on the eye tracking information obtained from the eye tracking unit. In one embodiment, the engine 355 can adjust optical distortion correction parameters of other components of the augment optics block 318, e.g., to prevent vergence-accommodation conflict. In an alternate embodiment, the engine 355 can adjust focus of images displayed on the electronic display 315, e.g., to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A composite optical element comprising:
a first optical component that includes a first front surface, a first back surface, and a first junction surface, and
a second optical component that includes an end surface, a second front surface, a second back surface, and a second junction surface,
wherein the first front surface and the second front surface together form a first surface of the composite optical element, and the first back surface and the second back surface together form a second surface of the composite optical element, and the second junction surface is coupled to the first junction surface to form a beam splitter that transmits light in a first band emitted from an electronic display through the first surface of the composite optical element and the second surface of the composite optical element prior to being directed towards an eye of a user and reflects light in a second band from the eye of the user passing through the first surface of the composite optical element so the light in the second band is directed toward the end surface, and light in the second band is different than the first band.

2. The composite optical element of claim 1, wherein the end surface is flat and is configured to transmit light in the second band.

3. The composite optical element of claim 1, further comprising a first imaging lens that is coupled to the end surface, wherein the first imaging lens has an optical power adjusting light in the second band.

4. The composite optical element of claim 3, wherein a detector is coupled to the composite optical element using a frame such that light in the second band passing through the first imaging lens is captured by the detector.

5. The composite optical element of claim 3, wherein the first optical component also includes an end surface, and the composite optical element further comprises a second imaging lens that is coupled to the end surface of the first optical component, wherein the second imaging lens has a second optical power adjusting light in the first band.

6. The composite optical element of claim 5, wherein the beam splitter is further configured to direct light in a third band that is different from the first band and the second band to the second imaging lens.

7. The composite optical element of claim 1, wherein the first band is a visible band of light and the second band is an infrared band of light.

8. The composite optical element of claim 1, wherein the first surface of the optical element has a first optical power.

9. The composite optical element of claim 1, wherein the second surface of the optical element has a first optical power.

10. The composite optical element of claim 1, wherein the first surface of the optical element has a surface profile selected from a group consisting of: a convex surface profile, a concave surface profile, an aspheric surface profile, a Fresnel surface profile, and a freeform surface profile.

11. The composite optical element of claim 1, wherein the second surface of the optical element has a surface profile selected from a group consisting of: a convex surface profile, a concave surface profile, an aspheric surface profile, a Fresnel surface profile, and a freeform surface profile.

12. The composite optical element of claim 1, wherein the light in the first band transmitted through the second surface of the composite optical element and the first surface of the composite optical element prior to entering an eye-box of a head-mounted display (HMD) including the eye of the user, and reflected light in the second band from the eye of the user of the HMD passes through the first surface of the composite optical element toward the end surface and an eye tracking unit is configured to capture images of the eye using the light in the second band passing through the end surface.

13. A head-mounted display (HMD) comprising:
a composite optical element comprising:
a first optical component that includes a first front surface, a first back surface, and a first junction surface, and
a second optical component that includes an end surface, a second front surface, a second back surface, and a second junction surface,
wherein the first front surface and the second front surface together form a first surface of the composite optical element, and the first back surface and the second back surface together form a second surface of the composite optical element, and the second junction surface is coupled to the first junction surface to form a beam splitter that transmits light in a first band emitted from an electronic display through the first surface of the composite optical element and the second surface of the composite optical element prior to being directed towards an eye of a user and reflects light in a second band from the eye of the user passing through the first surface of the composite optical element so the light in the second band is directed toward the end surface, and light in the second band is different than the first band.

14. The HMD of claim 13, wherein the end surface is flat and is configured to transmit light in the second band.

15. The HMD of claim 13, further comprising a first imaging lens that is coupled to the end surface, wherein the first imaging lens is configured to adjust an optical power of light in the second band.

16. The HMD of claim 15, further comprising:
a detector configured to detect light in the second band that passes through the first imaging lens, and
a frame that couples the detector to the composite optical element.

17. The HMD of claim 15, wherein the first optical component also includes an end surface, and the composite optical element further comprises a second imaging lens that is coupled to the end surface of the first optical component, wherein the second imaging lens is configured to adjust an optical power of light in the first band.

18. The HMD of claim 13, wherein the second surface of the optical element has a first optical power.

19. The HMD of claim 13, wherein the second surface of the optical element has a surface profile selected from a group consisting of: a convex surface profile, a concave surface profile, an aspheric surface profile, a Fresnel surface profile, and a freeform surface profile.

20. The HMD of claim 13, further comprising:
an eye tracking unit configured to capture images of the eye of the user using light in the second band that is reflected from the eye and passes through the first surface of the composite optical element and is directed by the beam splitter toward the end surface.

* * * * *